United States Patent
Campbell et al.

(10) Patent No.: US 6,917,733 B1
(45) Date of Patent: Jul. 12, 2005

(54) THREE-DIMENSIONAL OPTICAL SWITCH WITH OFFSET INPUT-OUTPUT PORTS

(75) Inventors: Eugene W. Campbell, Livermore, CA (US); Bryan P. Staker, Pleasanton, CA (US)

(73) Assignee: Glimmerglass Networks, Inc., Hayward, CA (US)

( * ) Notice: Subject to any disclaimer, the term of this patent is extended or adjusted under 35 U.S.C. 154(b) by 45 days.

(21) Appl. No.: 10/406,947

(22) Filed: Apr. 3, 2003

(51) Int. Cl.[7] .............................. G02B 6/35
(52) U.S. Cl. ........................ 385/18; 385/15; 385/24; 385/326
(58) Field of Search .............................. 385/18, 15, 24, 385/326

(56) References Cited

U.S. PATENT DOCUMENTS

| | | |
|---|---|---|
| 6,253,001 B1 | 6/2001 | Hoen |
| 2002/0071627 A1 * | 6/2002 | Smith et al. ................ 385/15 |
| 2003/0002783 A1 | 1/2003 | Neitson et al. |
| 2003/0095743 A1 * | 5/2003 | Fabiny ....................... 385/24 |
| 2003/0137660 A1 * | 7/2003 | Solgaard et al. ........... 356/326 |

FOREIGN PATENT DOCUMENTS

WO      01/92942 A2    6/2001

* cited by examiner

Primary Examiner—John R. Lee
Assistant Examiner—Zia R. Hashmi
(74) Attorney, Agent, or Firm—Townsend and Townsend and Crew LLP

(57) ABSTRACT

An optical switch globally minimizes maximum tilt angles used to route optical signals from input to output by disposition of an input array of first tiltable micromirrors within a first boundary typically having top-bottom reflection symmetry and left-right reflection symmetry and by disposition of an output array of second tiltable micromirrors within a second boundary a symmetry which matches the symmetry for the input array, the output array and the input array being disposed opposing one another and normal to parallel central axes and further being offset from one another in the plane of the normals to the arrays, so that a collimated beamlet impinging on the center the input array and reflected off at an equivalent angle intersects the output array at an offset.

10 Claims, 7 Drawing Sheets

THREE-DIMENSIONAL OPTICAL SWITCH WITH OFFSET INPUT-OUTPUT PORTS

STATEMENT AS TO RIGHTS TO INVENTIONS MADE UNDER FEDERALLY SPONSORED RESEARCH OR DEVELOPMENT

Not Applicable

CROSS-REFERENCES TO RELATED APPLICATIONS

Not Applicable

REFERENCE TO A "SEQUENCE LISTING", A TABLE, OR A COMPUTER PROGRAM LISTING APPENDIX SUBMITTED ON A COMPACT DISK.

Not Applicable

BACKGROUND OF THE INVENTION

This invention relates to a cross-connect switch for fiber-optic communication networks. In particular, this invention relates to a compact, multi-channel free-space optical cross-connect whereby switching is accomplished by tilting pairs of dual-axis micromirrors. Emergent communications systems use optical transmission through silica fibers using wavelength-division multiplexed (WDM) networks. As these systems evolve, requirements for reduced cost, form-factor, and power dissipation along with increased performance, scalability, and reliability become important in the design of efficient optical cross-connect systems. One particular type of optical cross-connect system utilizing dual-axis tilting micromirrors has been increasingly regarded as a technology which provides a solution to these constraints.

An example of prior art is Hoen, U.S. Pat. No. 6,253,001, which describes a free-space optical switch in which a plurality of collimated parallel beams is directed from a first two-dimensional fiber and lens array onto a first two-dimensional array of mirrors. Referring to FIG. 1, an unfolded optical switch 10 is shown as in Hoen having a collimator set 12, a first mirror set 14, a second mirror set 16, a second collimator set 18. In a specific configuration, sets 12 and 14 are configured to be inputs and sets 16 and 18 are configured to be outputs. A non-blocking optical switch is formed by directing collimated light from input set 12 onto the first dual-axis micromirror set 14. Light from the first micromirror set 14 is redirected to the second micromirror set 16, which redirects light into output collimator set 18. For optimal coupling, each individual collimator is assigned to a corresponding individual micromirror, for instance collimators 20, 22, and 24 are assigned to micromirrors 30, 32, and 34. To achieve an arbitrary non-blocking switch, an input micromirror, such as 30, must be able to swivel through a full range of motion to access all output mirrors, such as 32 and 34.

By tilting any two mirrors on the input and output mirror arrays, a non-blocking N×N cross-connect switch is established. For an N-port system, 2N fibers, lenses, and mirrors are required.

The fabrication and actuation methods of the micromirror arrays are key drivers for system cost and complexity. The fabrication methods for the mirror arrays involve either assembling discrete components or creating the arrays in parallel using batch fabrication techniques. Assembly of discrete components is an option for lower port-count switches, but it is generally not considered to be an appropriate cost-effective fabrication technique for larger port-count switches. For larger port-count switches, batch processing using advanced microfabrication techniques is an attractive alternative. These devices are referred to as Micro-Electrical Mechanical Systems (MEMS). The actuation methods of the MEMS mirrors typically fall into two categories: electrostatic and electromagnetic. Electromagnetic operation is generally used for large, discrete mirrors, because of the large forces that can be obtained. However, electromagnetic forces do not scale well for micro-devices. Electromagnetic actuation is challenging due to cross talk resulting from the difficulty of confining magnetic fields. In addition, high continuous currents, hysteresis, and immature processing techniques of magnetic materials call into question the reliability of electromagnetic operation. These constraints make it difficult to engineer compact, low-power electromagnetically actuated mirror arrays.

Electrostatic forces scale well for micro-devices. Electrostatic actuation techniques fall into two major categories, comb-drive actuation and parallel-plate actuation. In the case of comb-drive actuation, comb-drive actuators develop forces between interdigitated combs that are located away from the mirror by the use of linkage elements, which are typically in contact with each other. Although this technique has the advantage of decoupling electrostatic forces from the mirror design, allowing conceivably lower voltages for a given force, there are several significant disadvantages. These disadvantages include issues of compactness, difficulty in manufacturing, difficulty in interconnection, and the potential for undesired contact with adjacent components and regions.

Parallel-plate actuation overcomes many of the limitations of the other actuation methods. This actuation method utilizes non-contacting structures where the electrostatic forces are developed between the mirror and the lower electrodes. This actuation method avoids the reliability issues associated with contact. With backside interconnects, it can be engineered to be compact. Because the actuation is electrostatic, it is also low-power. However this technique typically requires higher voltages.

With all actuation techniques, there are trade-offs between tilt angle, switching time, voltage, and optical efficiency which make it desirable to limit the maximum tilt angle of the mirrors. For optical network restoration reasons, optical switches are generally required to have switching times on the order of 10 ms. Typical 256 port free-space optical designs require the mirror tilt angle reproducibility to be on the order of 1 part in 10,000. Assuming mirrors with highly damped fundamental torsional modes of oscillation, a minimum switching time of approximately one oscillation period is theoretically possible. This results in mirrors with a fundamental torsional resonant mode of about 100 Hz. It is difficult to maintain the stability required over the lifetime of a product. Even with a fully closed loop monitoring system, the calibration of the monitoring system can easily vary more than one part in 10,000.

As a result, optical monitoring of the coupled output power is generally required. A combination open-loop/closed-loop feedback system consisting of a single optical output power tap per output mirror may be used. In this system mirrors are steered open-loop to a position where power is coupled into the output fiber, although it may not be optimally coupled. Once light has been coupled into the output fiber, the mirrors are positioned using a servo control system to maximize the efficiency of the coupled light. In this case, a much more reasonable mirror reproducibility of approximately 1 part in 100 is required, which has been demonstrated to fall well within the capabilities of electrostatically actuated MEMS devices. With closed loop operation, a minimum of 3 to 10 cycles are generally required to capture and servo to maximum power. Because of this, mirrors with a fundamental resonant mode of 300 Hz to 1 kHz are generally required to achieve 10 ms switching times. Such mirrors have stiff hinges, which require significant electrostatic force to achieve a given tilt angle.

The maximum tilt angle of a parallel-plate actuated MEMS device is closely coupled with the maximum voltage that may be applied between the electrodes. Trade-offs between tilt angle, resonant frequency, voltage, and optical efficiency make it desirable to minimize the tilt angles of the mirrors.

Inventions are known wherein oval mirrors are disposed in arrays in a three dimensional switch similar to that shown in FIG. 1. Reference is made to PCT publication WO 01/92942 dated 6 Dec. 2001 in the name of Applicant Calient Networks. Therein the oval mirrors arc provided to accommodate beamlets which project with oval footprints. Therein the axis of each micromirror that is perpendicular to the plane of an incident and reflected beamlet is parallel to the minor axis of the micromirror. This is done to permit greater rotation of the micromirror around the major axis of the micromirror. As a consequence, the arrays are designed to fit within an oval boundary that has it major axis transverse and generally perpendicular to the plane of the incident and reflected beamlets, that is, it was wider than its length. As a result, it has been discovered that micromirrors near one periphery must be rotatably displaced much greater than others near an opposing periphery to address all micromirror locations. There is no suggestions of minimization of tilt angles.

Byway of background, the concept of optical MEMS switches with converging beams are known. Examples of how to realize converging beamlets is taught in Published U.S. patent application Publication No. US 2003/0002783 published Jan. 2, 2003 in the name of Lucent Technologies, Inc. of Holmdel, N.J.

What is needed is a solution which globally minimizes the maximum tilt angles of all the micromirrors while still maintaining a compact, efficient, and cost-effective optical switch.

SUMMARY OF THE INVENTION

According to the invention, a three-dimensional free-space optical switch is provided which globally minimizes maximum tilt angles used to route optical signals from assigned input positions to assigned output positions, the switch including an input array of fibers and an optical system for producing collimated beamlets and an output array of beamlet targets, an input array of first tiltable micromirrors, the set of the first micromirrors being disposed within a first boundary typically having top-bottom reflection symmetry and left-right reflection symmetry (if the arrays are flat), an output array of second tiltable micromirrors, the output array being disposed within a second boundary typically having at least top-bottom symmetry which matches the top-bottom and left-right reflection symmetry for the input array, the output array and the input array being disposed opposing one another and normal to parallel central axes and further being offset from one another in the plane of the normals to the arrays, so that a collimated beamlet impinging on the center the input array and reflected off at an equivalent angle intersects the output array at an offset from the center of the output array. In a specific embodiment where a circular micromirror precession generates an ovoidal path defining the boundary of accessible positions on a planar target, the input beamlet positions of the input array and output target positions of the output array are bounded by identically-shaped symmetrically elliptical patterns that are offset relative to a nominal central beamlet that intersects the input array and the output array in the plane of the normals to the arrays.

The invention will be better understood by reference to the following detailed description in connection with the accompanying drawings.

BRIEF DESCRIPTION OF THE DRAWINGS

FIG. 8 is a side view of a free-space optical switch of the prior art showing a

FIG. 3.

DESCRIPTION OF SPECIFIC EMBODIMENTS OF THE INVENTION

Figure 1:
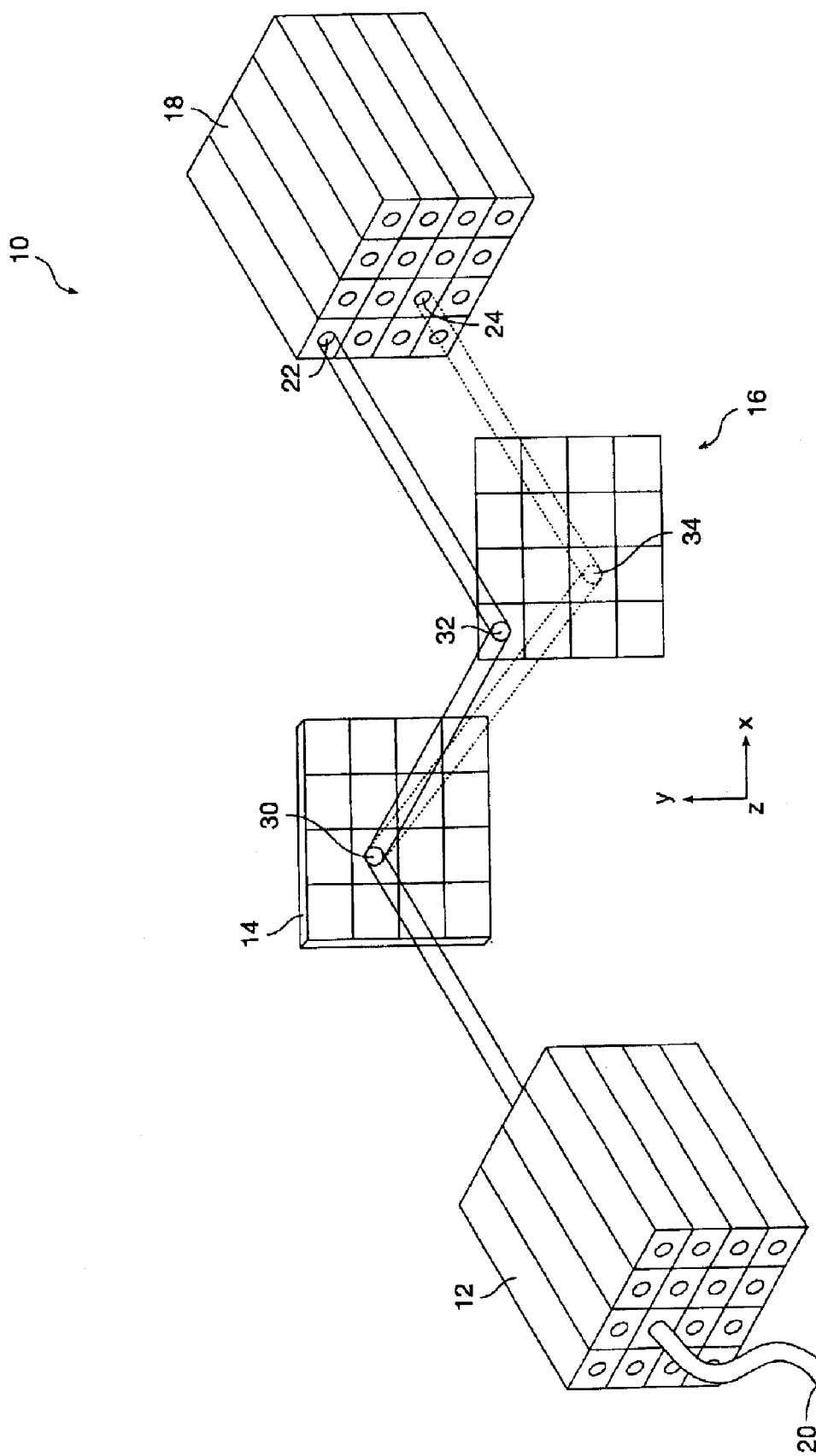
FIG.1 is a perspective view of a free-space optical switch of the prior art.
Figure 2A:
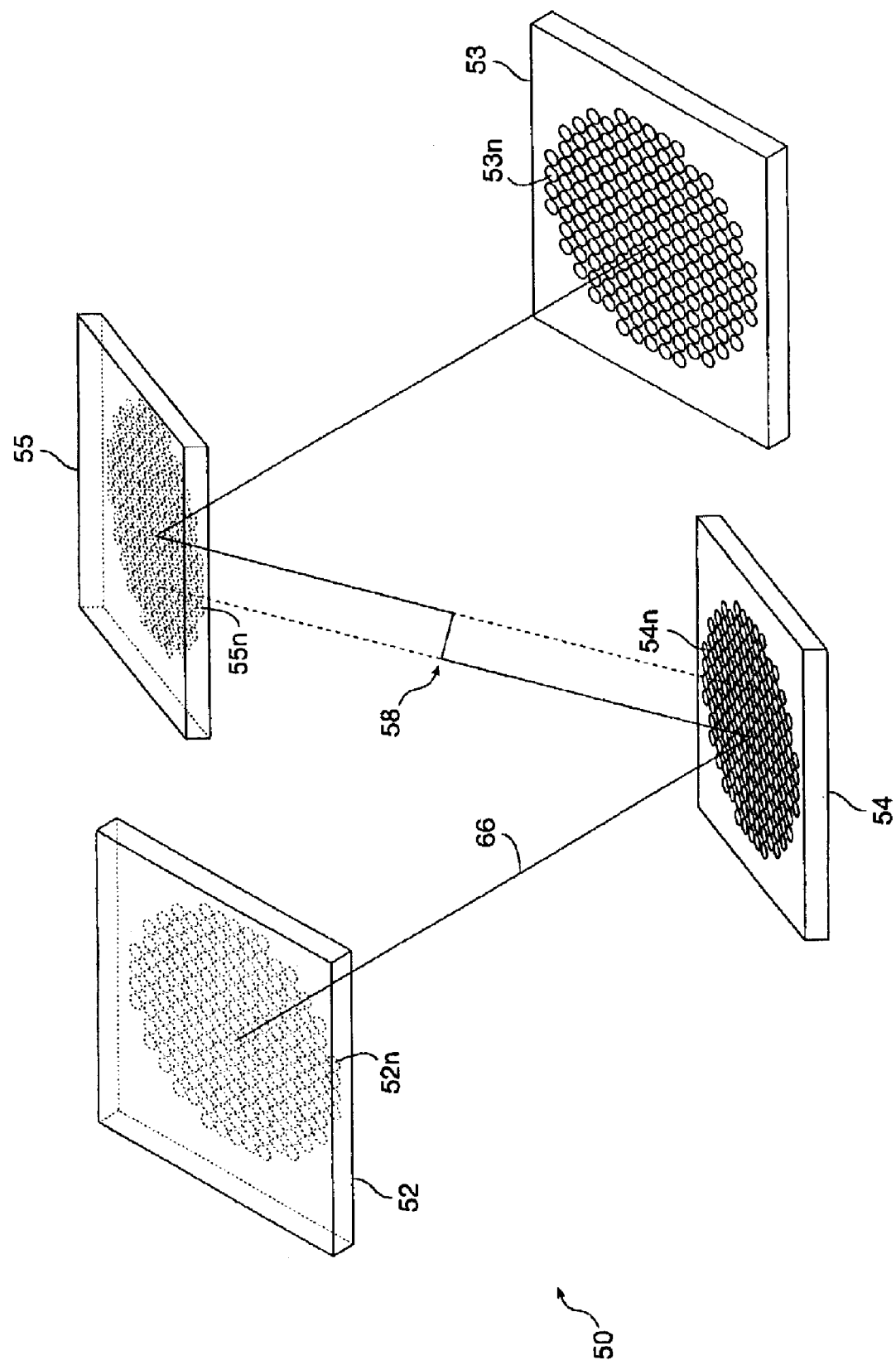
FIGS. 2A and 2B are respectively a perspective view and a side view of a free-space optical switch according to the invention.
Figure 2B:
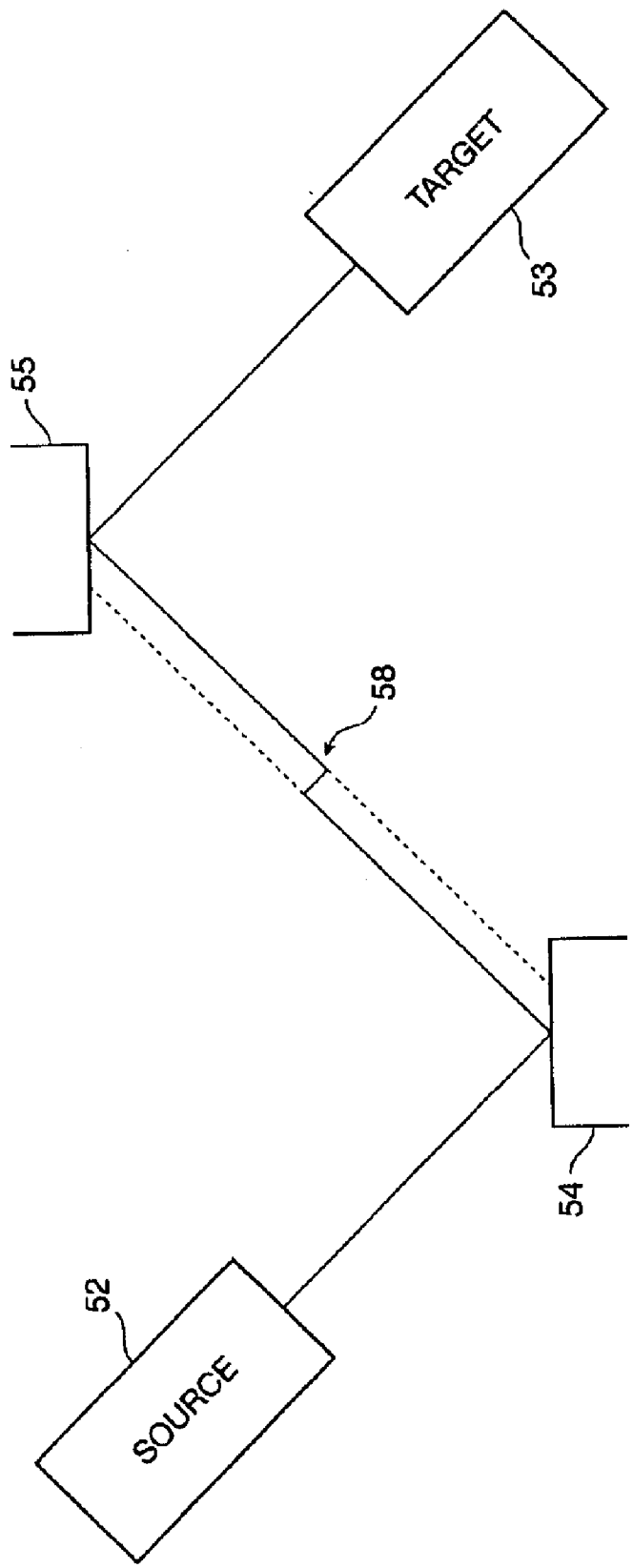

FIGS. 2A and 2B an optical switch 50 is shown according to the invention that comprises a first or source set of collimated beamlets 52, a first micromirror set 54, a second micromirror set 55, and a second or target set of collimated beamlets 53. For optimal coupling, each individual micromirror 54n corresponds to a specific source beamlet 52n, and each individual micromirror 55n corresponds to an individual beamlet target 53n. The source set, the target set and the arrays may be planar, but they need not be for the purposes of this invention. For example, the source set 52 may be directed through a converging lens or arranged on a concave surface to direct the beamlets to a concentrated first micromirror set 54, and the target set 53 can be disposed behind a convergent lens or arranged on a concave surface. Using conventional technology, the micromirror sets 54, 55 cannot be easily fabricated on non-planar surfaces. However, such a construction is within the contemplation of the present invention. This embodiment further globally minimizes the maximum tilt angles in accordance with the invention.

A nonblocking optical switch is realized by directing individual collimated beams from the source set 52 along the path via the micromirror sets 54 and 55 to the target set 53 by applying a signal to the two micromirror sets 54, 55 to steer a source beamlet to a beamlet target 53n which has a position established by the steady-state signal applied to the illuminated micromirrors 54n, 55n in the beamlet path. A precalculation of tilt angle for a ray known to be received from a specified direction is provided for a specified coupling. Each output micromirror 55n always directs a beamlet to its corresponding beamlet target 53n and each input micromirror 54n will always receive a beamlet from its designated source 52n. This design is optimized for single-mode optical fibers to assure optimal coupling, although the design also works for multimode fibers.

Figure 3:
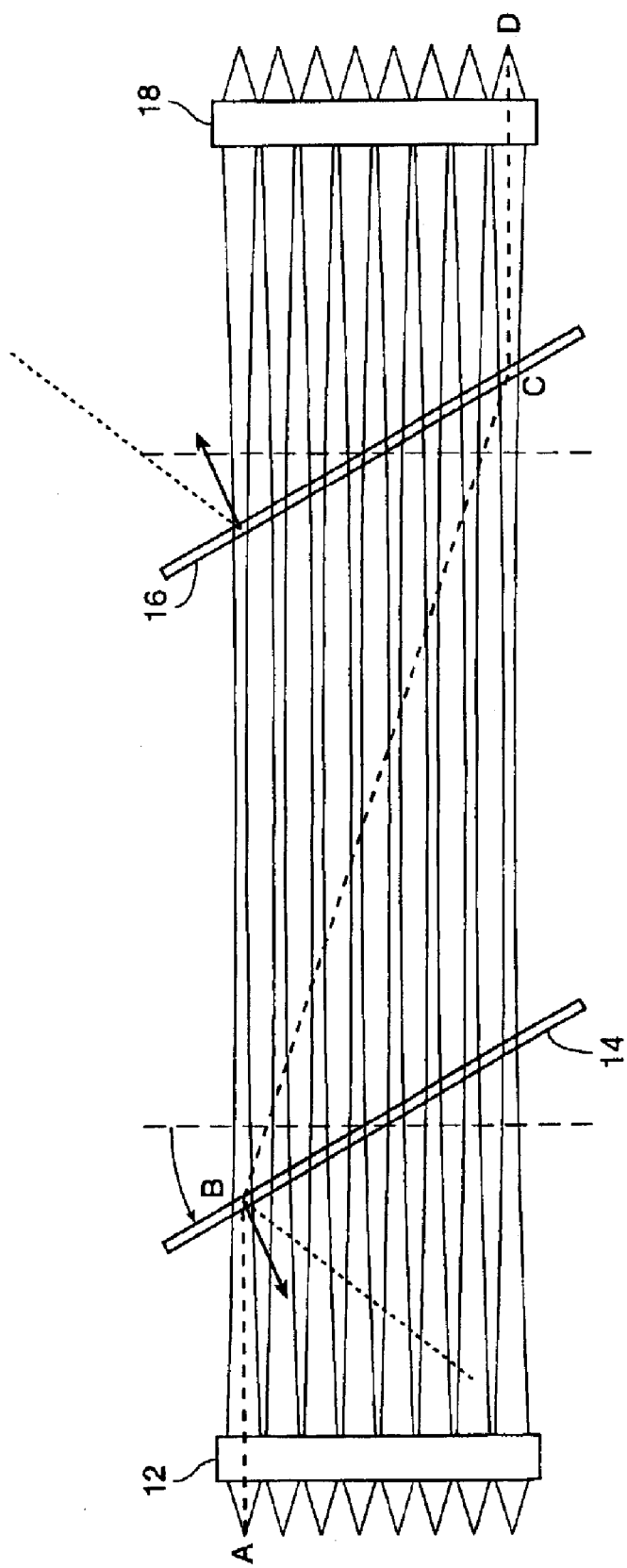
FIG. 3 is a side view of a free-space optical switch of the prior art, wherein the folded optical space has been unfolded about the planes of the micromirror arrays to illustrate the geometrical relationship between the two micromirror arrays.
Figure 8:
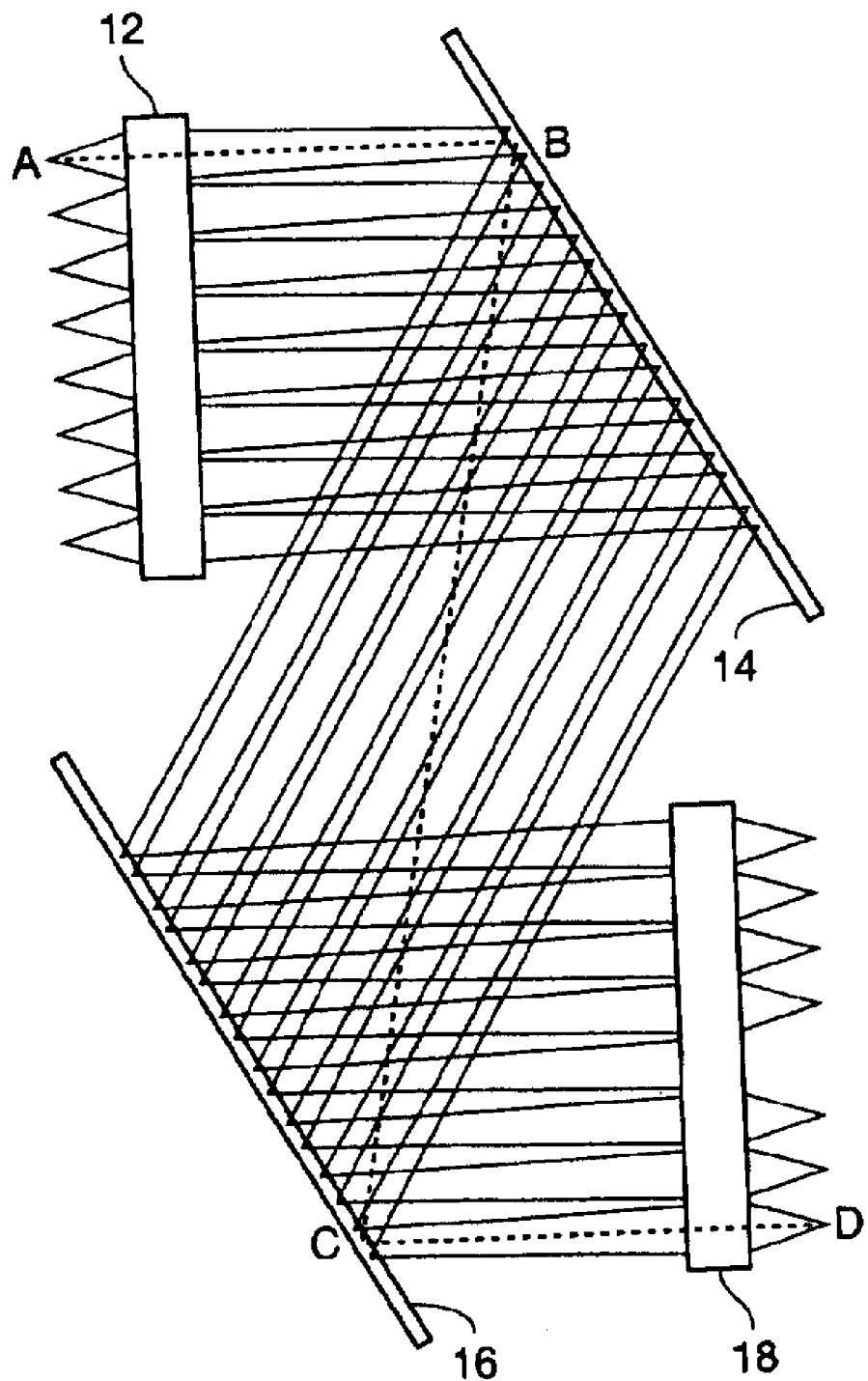

In order to globally minimize the maximum required tilt angles of the micromirrors according to the invention, there is a preferential relative offset and distribution of input micromirrors and output micromirrors. The micromirror set 54 is offset by a selected distance 58 from the array pattern of micromirror set 55 in the plane of normal to the micromirror sets 54 and 55. The micromirror sets 54 and 55 are each identically symmetric patterns, preferably elliptical, with both top-bottom symmetry and left-right symmetry. However, other patterns with at least left-right symmetry relative to the plane of normals are also within the contemplation of the invention. Such patterns include hexagonal, paraboloidal and rectangular patterns for a folded and equivalent unfolded arrangement, as shown in FIG. 2, FIG. 3 and FIG. 8.

Figure 5:
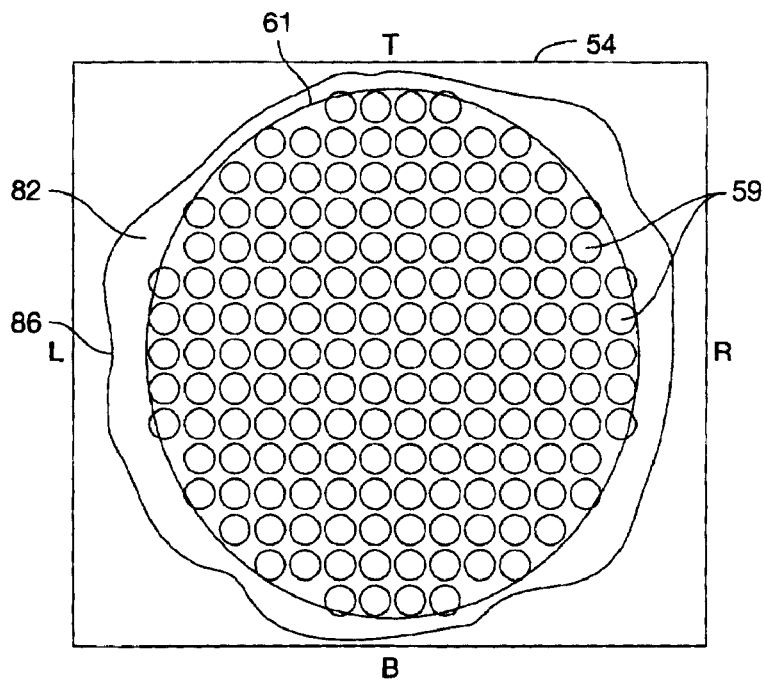
FIG. 5 is a top view of selected input/output mirrors of a system.

FIG. 5 shows the boundaries for an input micromirror set 54 and output micromirror set 55 that contain arrays of micromirrors 54n, 55n where the centers of the mirrors fall within an elliptical boundary. The ellipse boundary is selected for best fit within both of the ovoids generated by the circular micromirror precessions on both the input array and the output array. It is understood that input and output are readily reversible. There is a theoretical optimal allocation and placement of input and output micromirrors for minimal tilt angles for both circularly symmetric displacement and circularly asymmetric (generalized) displacement of mirrors to optimize performance (e.g., switching speed, voltage, form factor). For circularly symmetric displacement mirrors (where the precession of the micromirror is circular), the shape of the preferred region 61 is an ovoid subject to discretization, as shown in FIG. 5. For example, a micromirror 82 whose center is within the ellipse is useable in accordance with the invention.

Figure 6:
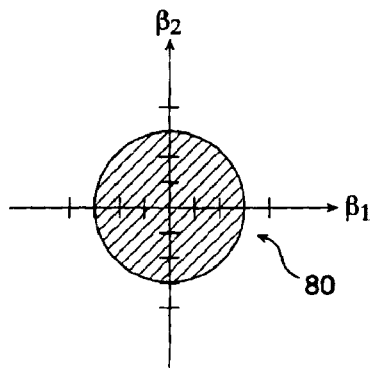
FIG. 6 is a graphical representation of a circular tilt angle locus of single micromirror.

The maximum available tilt angle of each micromirror is not limited to a circular locus in angle space, as illustrate in FIG. 6. Other constraints include physical or electronic limitations, such as maximum applicable voltage, maximum displacement, and maximum tilt-to-voltage variation sensitivity. These noncircular loci in angle space, such as shown in FIG. 7, are generally reproducible from mirror to mirror and can be used to generate boundaries for optimum mirror placement, based on loci representing a standard mirror mounted at all positions within the boundary on the opposing array.

FIG. 6 illustrates a circular tilt angle locus 80 for the precession of a standard or reference micromirror, where the β1 axis and the β2 axis represent the tilt angles about orthogonal directions. The axes β1 and β2 are rotations about orthogonal axes in a Cartesian coordinate system contained within the plane of the micromirror array. This mirror tilt pattern produces an ovoid pattern on the plane of the opposing micromirror array upon reflection of an incident beamlet. In this manner, the micromirror can access any point on the array of opposing or target micromirrors within the boundary of the set of target micromirrors.

Figure 4:
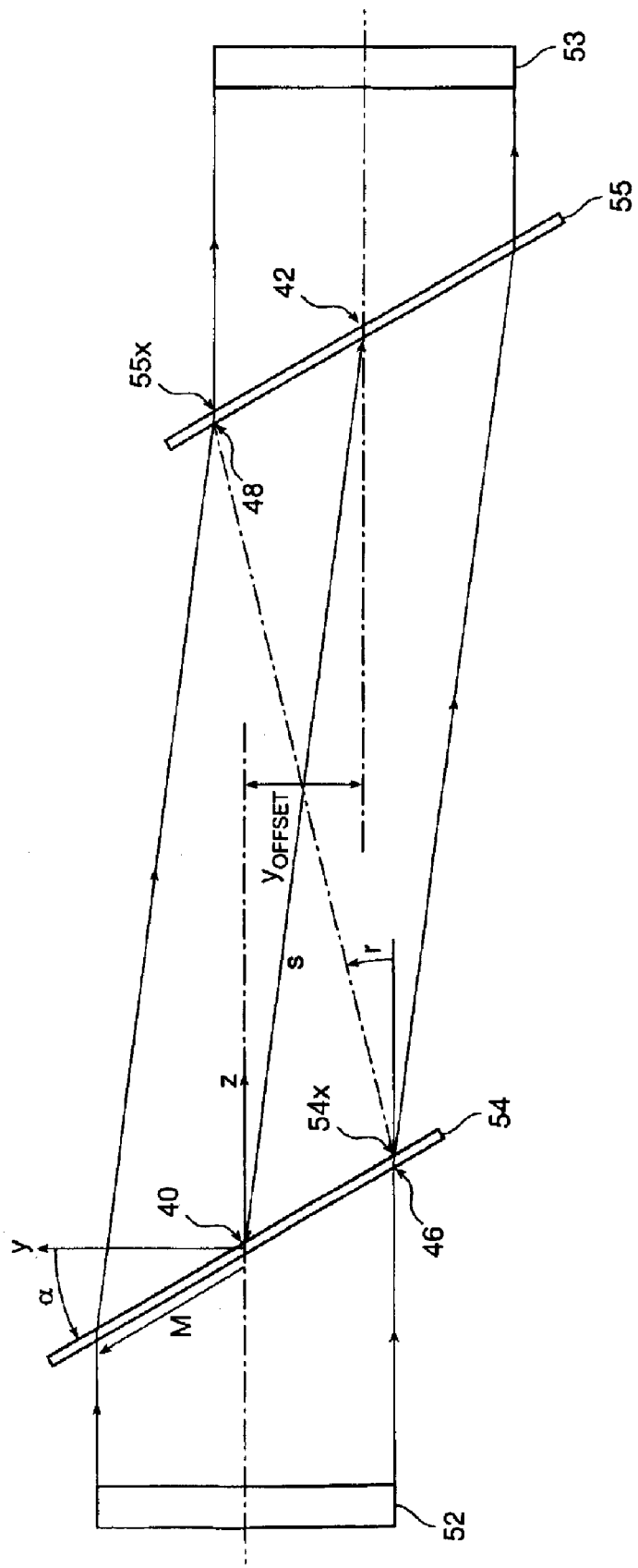
FIG. 4 is a side view of a free-space optical switch according to the invention, wherein the optical space has been unfolded about the planes of the micromirror arrays to illustrate the geometrical relationship between the two micromirror arrays.
Figure 7:
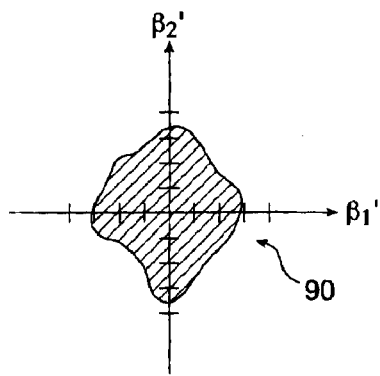
FIG. 7 is a graphical representation of a generalized tilt angle locus of single micromirror.

FIG. 7 illustrates a generalized tilt angle locus 90 of a standard micromirror, where the β1 axis and the β2 axis also represent the tilt angles about orthogonal directions. For an arbitrary locus, it is desirable to minimize the maximum tilt angle allowed by micromirror within the boundary. Referring to FIG. 4, for a circular precession of a micromirror, an expression useful as a starting point to generate the boundary shape and size of the optimum region of mirror placement is given as follows:

$$y_{offset} = 2 \cdot M \cdot \sin \alpha \cdot \tan \Gamma$$

and $$S = \sqrt{y_{offset}^2 + \left(\frac{2 \cdot M \cdot \cos \alpha}{\tan \Gamma}\right)^2}$$

where $y_{offset}$ is the decentration of the centroid of the second MEMS array from the centroid of the first MEMS array along a nominal beamlet axis between the two arrays in the plane of the normals of the two arrays, s is the separation distance between the centroid of the first MEMS array and the centroid of the second MEMS array;

M is the half dimension of the height of the optimum region of mirror placement;

α is the tilt angle of the normal vector located at the centroid of the MEMS array with respect to the direction of propagation of the incident beamlet at the centroid;

Γ is twice the maximum polar angle of tilt $\gamma_{max}$ of the normal vector of a micromirror relative to its rest state (e.g., for a planar array, the normal of a micromirror with respect to the normal to the MEMS plane. Note that the micromirror's normal has unit magnitude, and its direction is specified in spherical coordinates).

A trivial coordinate transformation exists to relate the Cartesian rotations β1 and β2 to the polar rotation in y of the foregoing function. The minor axis of the ellipse is more easily found by numerical methods of iteration.

The boundary to the optimum region can be thought of as the intersection of all addressable areas, namely, the regions given by all possible intercepts with the second or target MEMS array of a beamlet reflected off each micromirror in the first MEMS array. The MEMS tilt angle, α, is a parameter describing the overall system geometry and does not vary for a given embodiment. The intercept for the nominal micromirror position (γ=0) is offset by $y_{offset}$ from the origin of the x, y coordinate system in the second MEMS plane. If the micromirror polar angle γ is constrained to a constant maximum value $\gamma_{max}$ for any azimuthal angle, then the boundary to the optimum region is ovoidal in shape, with one end slightly wider than the other end. For small α and γ, the ovoid is nearly elliptical. Because the two MEMS arrays are effectively rotated by 180 degrees with respect to each other, the 'top' of one array is nearest the 'bottom' of the other. In order to maintain symmetry of one MEMS array as viewed from another, an elliptically shaped region is preferred for the boundary of the active MEMS elements.

An important aspect of the invention is the $y_{offset}$ depicted in FIG. 4, which is a side view of a free-space optical switch according to the invention, wherein the optical space has been unfolded about the planes of the micromirror arrays 54, 55 to illustrate the geometrical relationship between the two micromirror arrays 54, 55. According to the invention, the centroid 40 of the first micromirror array 54 is offset from the centroid 42 of the second micromirror array 55 by an offset 58 whose amount is specified by $y_{offset}$ along a nominal beamlet axis between the two arrays. The offset is in the plane of the normals of the micromirror arrays, which is the plane of FIG. 4. The offset compensates for the amount of tilt otherwise required by the individual micromirrors 54x, 55x at the extreme edges of both arrays 54, 55 so that the maximum tilt of the micromirrors 54x, 55x at the extreme edges 46, 48 is minimized. As a result, the maximum required electrostatic actuation voltage of the system is minimized. In a configuration employing concave source arrays and target arrays, voltage requirements are further reduced or alternatively for a given voltage, the number of micromirrors that can be addressed is increased.

The invention has been explained with respect for specific embodiments. Other embodiments will be evident to those of ordinary skill in the art. Therefore, it is not intended that the invention be limited, except as indicated by the appended claims.

What is claimed is:

1. A three-dimensional free-space optical switch for globally minimizing maximum tilt angles used to route optical signals from assigned input positions to assigned output positions, said optical switch comprising:

a two-dimensional input array of fibers;

an optical system for producing collimated beamlets coupled to said input array;

a two-dimensional output array of beamlet targets;

a two-dimensional input array of first tiltable micromirrors, said first micromirrors being disposed within a first boundary within a first plane having a first reflection symmetry; and a two-dimensional output array of second tiltable micromirrors, said output array being disposed within a second boundary within a second plane having a second reflection symmetry matching said first reflection symmetry, said output array and said input array being disposed opposing one another and normal to parallel central axes of the respective first and second planes and further being offset from one another in the plane of the normals to said input array and said output array, so that a reference ray originating from the center of the input array of fibers and normal to the plane containing the input array of fibers impinging on the center said input array and reflected off at an equivalent angle intersects said output array at an offset from the center of said output array.

2. The apparatus according to claim 1 wherein a circular micromirror precession generates an ovoidal path defining the boundary of accessible positions on a planar target, the input beamlet positions of the input array and output target positions of the output array being bounded by identically-shaped symmetrically elliptical patterns that are offset relative to a nominal central beamlet that intersects the input array and the output array in the plane of the normals to the arrays.

3. The apparatus according to claim 1 wherein the first boundary and said second boundary are identical in size.

4. The apparatus according to claim 1 wherein collimated optical signals between the fibers and the micromirrors are disposed to be converging.

5. The apparatus according to claim 1 wherein collimated optical signals between the fibers and the micromirrors are disposed to be in parallel.

6. In a three-dimensional free-space optical switch including first and second two-dimensional arrays of fibers, and collimators for optical signals, the improvement comprising:

a first two-dimensional array of tiltable micromirrors, the micromirrors being disposed within a first boundary with left-right reflection symmetry and top-bottom reflection symmetry; and a second two-dimensional array of tiltable micromirrors, the micromirrors being disposed within a second boundary identical in shape to said first boundary, said first array and said second array being disposed at locations so that a reference ray originating from the center of the first array of fibers and normal to the plane containing the first array of fibers impinging on the center the first array of micromirrors and reflected off at an equivalent angle intersects the second array of micromirrors at an offset in the plane of the ray and its reflection in order to globally minimize maximum tilt angles for a preselected locus of tilt angles of all said micromirrors used to route optical signals.

7. The apparatus according to claim 6 wherein the locus of tilt angles of said micromirrors is circular.

8. The apparatus according to claim 6 wherein the first boundary and said second boundary are identical in size.

9. The apparatus according to claim 6 wherein collimated optical signals between the fibers and the micromirrors are disposed to be converging.

10. The apparatus according to claim 6 wherein collimated optical signals between the fibers and the micromirrors are disposed to be in parallel.

* * * * *